United States Patent
Pandian et al.

(10) Patent No.: US 11,078,708 B2
(45) Date of Patent: Aug. 3, 2021

(54) HYDRAULIC PISTON ACTUATOR FOR A DOOR

(71) Applicant: Hamilton Sundstrand Corporation, Charlotte, NC (US)

(72) Inventors: Navaneethakrishnan Pandian, Karnataka (IN); Rajasekaran Janakiraman, Karnataka (IN)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 495 days.

(21) Appl. No.: 15/897,600

(22) Filed: Feb. 15, 2018

(65) Prior Publication Data

US 2019/0145144 A1 May 16, 2019

(30) Foreign Application Priority Data

Nov. 13, 2017 (IN) .............................. 201711040414

(51) Int. Cl.
| | |
|---|---|
| *E05F 15/53* | (2015.01) |
| *B64D 29/08* | (2006.01) |
| *B64D 29/06* | (2006.01) |
| *F15B 15/14* | (2006.01) |
| *B64D 29/00* | (2006.01) |

(52) U.S. Cl.
CPC .............. *E05F 15/53* (2015.01); *B64D 29/00* (2013.01); *B64D 29/06* (2013.01); *B64D 29/08* (2013.01); *F15B 15/1433* (2013.01); *F15B 15/1461* (2013.01); *E05Y 2201/448* (2013.01); *E05Y 2900/502* (2013.01); *E05Y 2900/531* (2013.01)

(58) Field of Classification Search
CPC .. F15B 15/1443; F15B 15/1428; B64D 29/08; B64D 29/06; B64D 29/00

USPC ........................................................ 92/165 R
See application file for complete search history.

(56) References Cited

U.S. PATENT DOCUMENTS

| | | | | |
|---|---|---|---|---|
| 4,399,966 | A * | 8/1983 | Crudden ................ | B64D 29/08 244/129.4 |
| 4,582,329 | A | 4/1986 | Stalph | |
| 4,739,695 | A * | 4/1988 | Mountney ........... | F15B 15/1433 92/252 |
| 9,638,251 | B2 | 5/2017 | Thoma et al. | |
| 2001/0047719 | A1 | 12/2001 | Niwa et al. | |
| 2016/0025220 | A1* | 1/2016 | Cooper ............... | F15B 15/1433 92/153 |

(Continued)

FOREIGN PATENT DOCUMENTS

| | | |
|---|---|---|
| FR | 2615914 A1 | 12/1988 |
| GB | 2095333 A | 9/1982 |
| WO | 2015143217 A1 | 9/2015 |

OTHER PUBLICATIONS

European Search Report for Application No. 18205020.3 dated Apr. 5, 2019; 8 pages.

*Primary Examiner* — Abiy Teka
*Assistant Examiner* — Daniel S Collins
(74) *Attorney, Agent, or Firm* — Cantor Colburn LLP

(57) ABSTRACT

A hydraulic piston actuator, which may be used for an aircraft nacelle assembly, includes a housing, a piston, an end gland, and a bearing ring. The housing is concentrically disposed along an axis. The piston is adapted to axially reciprocate within the housing. The end gland is disposed radially between the housing and the piston. The bearing ring is disposed radially between the end gland and the piston.

2 Claims, 4 Drawing Sheets

(56) References Cited

U.S. PATENT DOCUMENTS

2016/0245387 A1\* 8/2016 Pandian .................. F16H 53/02

\* cited by examiner

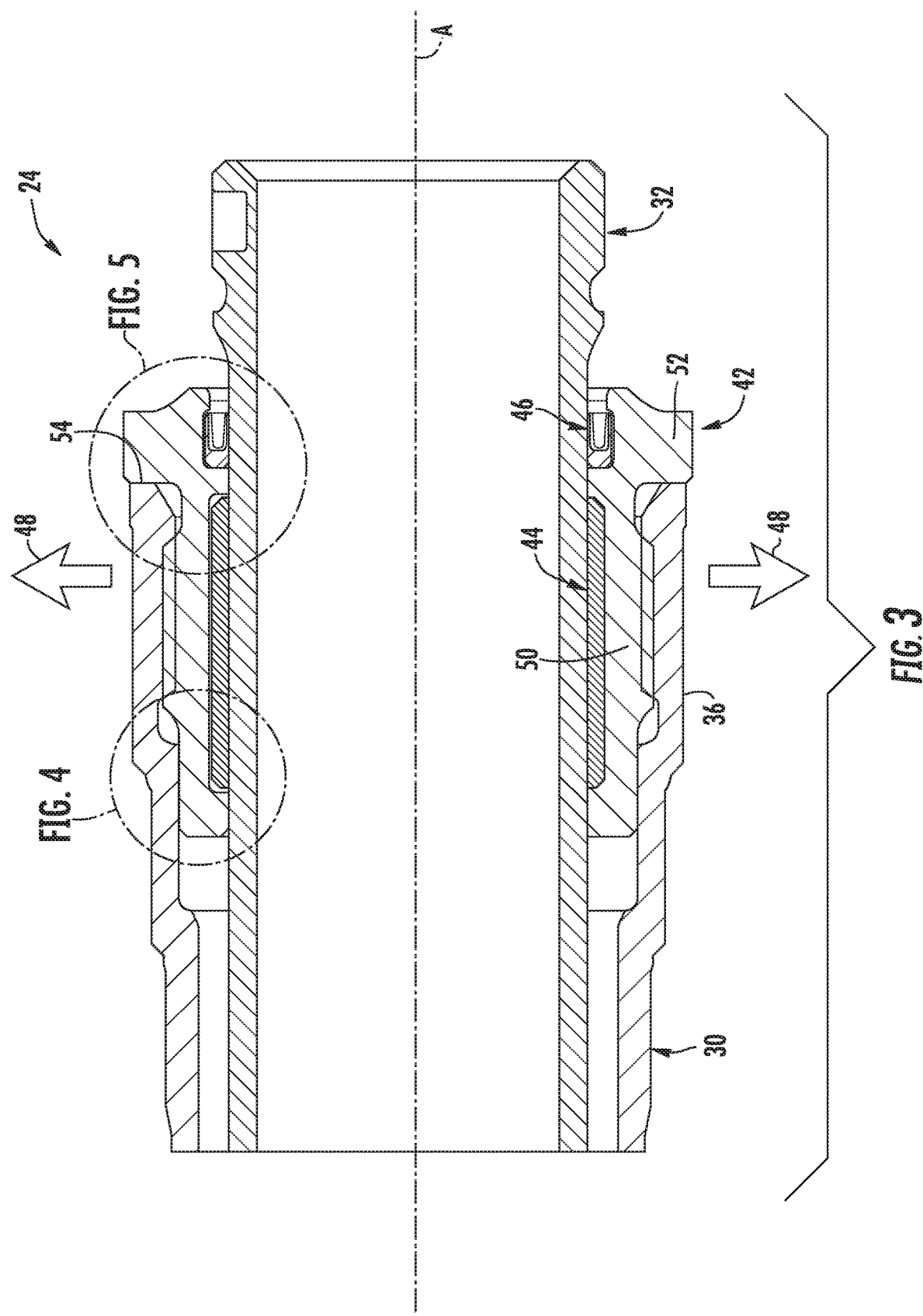

HYDRAULIC PISTON ACTUATOR FOR A DOOR

CROSS-REFERENCE TO RELATED APPLICATIONS

This application claims the benefit of Indian Application No. 201711040414 filed Nov. 13, 2017, which is incorporated herein by reference in its entirety.

BACKGROUND

The present disclosure relates to a hydraulic piston actuator, and more particularly, to a hydraulic piston actuator of an aircraft engine cowl door.

Hydraulic piston actuators are often applied to lift doors and/or lids. One application example may be hydraulic piston actuators used to open aircraft engine cowl doors of a Nacelle. Such actuators may be of a single acting type with a scraper seal integrated into an end gland generally located at a piston head, or end, of a reciprocating piston rod. The axial distance that the piston rod reciprocates is dictated by the length requirements of the actuator needed to fully lift the door from a closed position. The piston rod may be made of stainless steel, has an outer diameter that may be ground during a manufacturing process, and typically has no coating. In some applications, no working medium, or lubricant, is used between the end gland and the outer cylindrical surface of the piston rod. A radial clearance between the end gland and the piston rod may be maintained per established seal standards for a particular application. Unfortunately, the piston actuator may be subject to sinusoidal/harmonic vibrations at the end gland location. Such vibration may lead to material pickup from the end gland to the piston rod outer surface. An inferior surface finish of the piston rod may impair, or damage, the scraper seal, or generally reduce the working life of the piston actuator, and/or induce the need for maintenance.

BRIEF DESCRIPTION

A hydraulic piston actuator according to one, non-limiting, embodiment of the present disclosure includes a housing concentrically disposed along an axis; a piston adapted to axially reciprocate within the housing; an end gland disposed radially between the housing and the piston; and a bearing ring disposed radially between the end gland and the piston.

Additionally to the foregoing embodiment, the end gland is fixed to the housing.

In the alternative or additionally thereto, in the foregoing embodiment, the hydraulic piston actuator includes a scraper seal disposed radially between the end gland and the piston.

In the alternative or additionally thereto, in the foregoing embodiment, the scraper seal is axially spaced outward from the bearing ring.

In the alternative or additionally thereto, in the foregoing embodiment, the end gland defines an annular channel communicating radially inward, and the bearing ring is substantially disposed in the channel.

In the alternative or additionally thereto, in the foregoing embodiment, the end gland defines a circumferentially continuous channel communicating radially inward, and the bearing ring is substantially disposed in the channel.

In the alternative or additionally thereto, in the foregoing embodiment, the piston includes a cylindrical face facing radially outward, and the end gland includes a first and second cylindrical surfaces spaced axially apart by the channel and opposing the cylindrical face.

In the alternative or additionally thereto, in the foregoing embodiment, the scraper seal is axially spaced from the bearing ring by the second cylindrical surface.

In the alternative or additionally thereto, in the foregoing embodiment, a first clearance is defined by and between the first cylindrical surface and the cylindrical face, and a second clearance is defined by and between the second cylindrical surface and the cylindrical face.

In the alternative or additionally thereto, in the foregoing embodiment, the bearing ring is in sliding contact with the cylindrical face.

In the alternative or additionally thereto, in the foregoing embodiment, the scraper seal is in sliding contact with the cylindrical face.

In the alternative or additionally thereto, in the foregoing embodiment, the bearing ring is made of a material that includes thermoplastic, and the piston is metallic.

In the alternative or additionally thereto, in the foregoing embodiment, the thermoplastic is re-inforced with carbon fiber/graphite.

In the alternative or additionally thereto, in the foregoing embodiment, the piston is made of stainless steel.

In the alternative or additionally thereto, in the foregoing embodiment, the hydraulic piston actuator is a dry hydraulic piston actuator.

An aircraft nacelle assembly according to another, non-limiting, embodiment includes a substructure; a cowl door pivotally connected to the substructure; and a hydraulic piston actuator including: a housing concentrically disposed along an axis and pivotally connected to one of the substructure and the cowl door; a piston adapted to axially reciprocate within the housing and pivotally connected to the other of the substructure and the cowl door; an end gland fixed to the housing and disposed radially between the housing and the piston; a bearing ring fixed to the end gland and projecting radially inward from the end gland for sliding contact with the piston; and a scraper seal supported by the housing and in sliding contact with the piston.

Additionally to the foregoing embodiment, the scraper seal is disposed radially between the end gland and the piston.

In the alternative or additionally thereto, in the foregoing embodiment, the end gland defines an annular channel communicating radially inward, and the bearing ring is substantially disposed in the channel.

In the alternative or additionally thereto, in the foregoing embodiment, the piston includes a cylindrical face facing radially outward, and the end gland includes first and second cylindrical surfaces spaced axially apart by the annular channel, and wherein the first and second cylindrical surfaces both oppose the cylindrical face.

In the alternative or additionally thereto, in the foregoing embodiment, a first clearance is defined by and between the first cylindrical surface and the cylindrical face, and a second clearance is defined by and between the second cylindrical surface and the cylindrical face.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 3 is a partial enlarged cross section of the hydraulic piston actuator;

DETAILED DESCRIPTION

Figure 1:
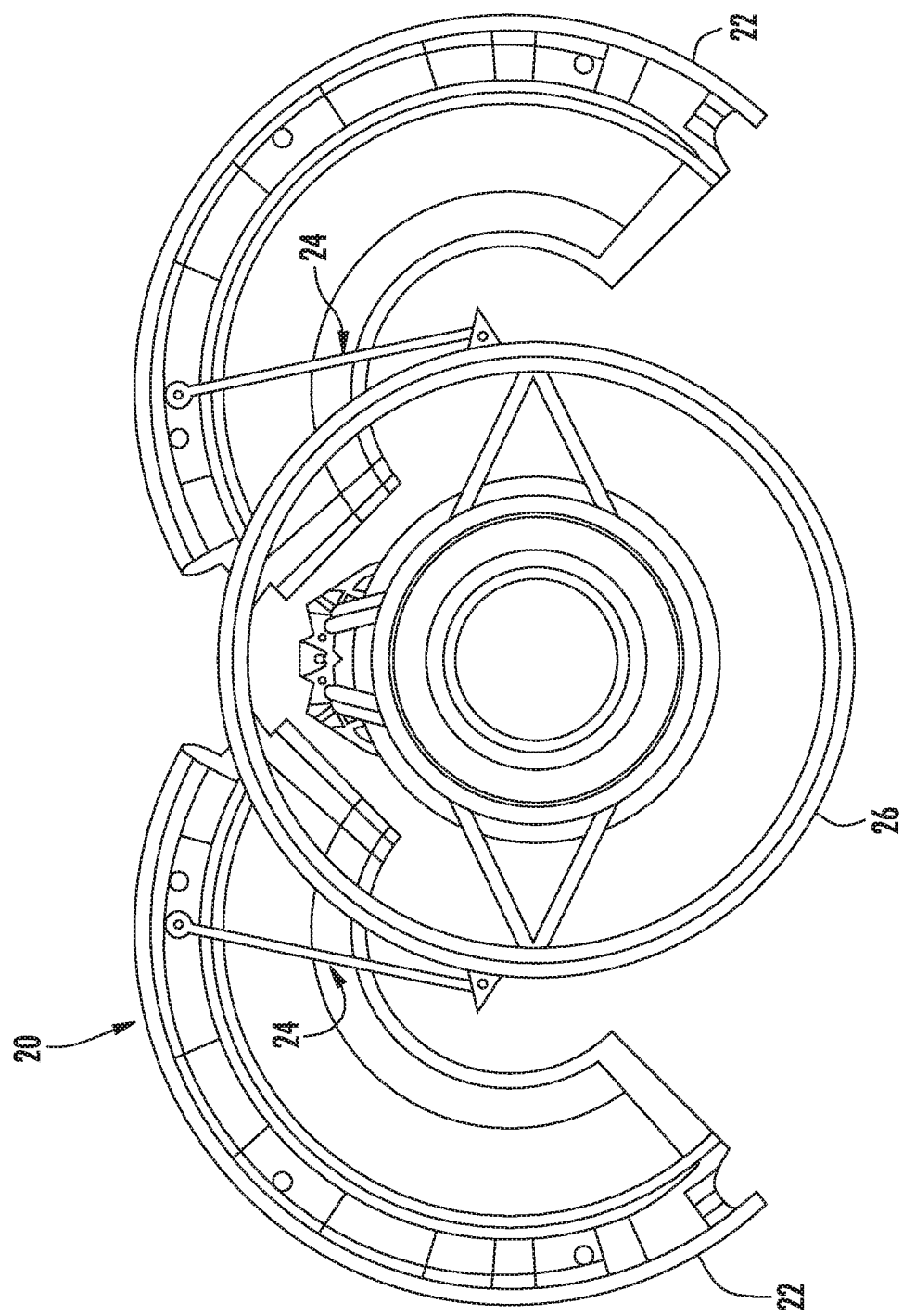
FIG. 1 is a cross section of an aircraft engine nacelle utilizing a hydraulic piston actuator as one, non-limiting, embodiment of the present disclosure.

Referring to FIG. 1, an aircraft engine nacelle 20 having access cowl doors 22 is illustrated as one application of a hydraulic piston actuator 24. The cowl door 22 may be hinged, or pivotally connected, to a substructure 26 of the engine nacelle 20. For each cowl door 22, at least one piston actuator 24 may be pivotally connected between the substructure 26 and the cowl door 22 to facilitate opening and closing of the door. It is contemplated and understood that the door 22 may be other door types including, for example, hatches or doors, used on automobiles or any other application where the piston actuator 24 may be exposed to vibrations. In one embodiment, the hydraulic piston actuator 24 may be a dry sliding piston actuator. In further embodiments, the dry sliding piston actuator 24 may be applied to any application that may be exposed to radial loads caused, for example, by vibration.

Figure 2:
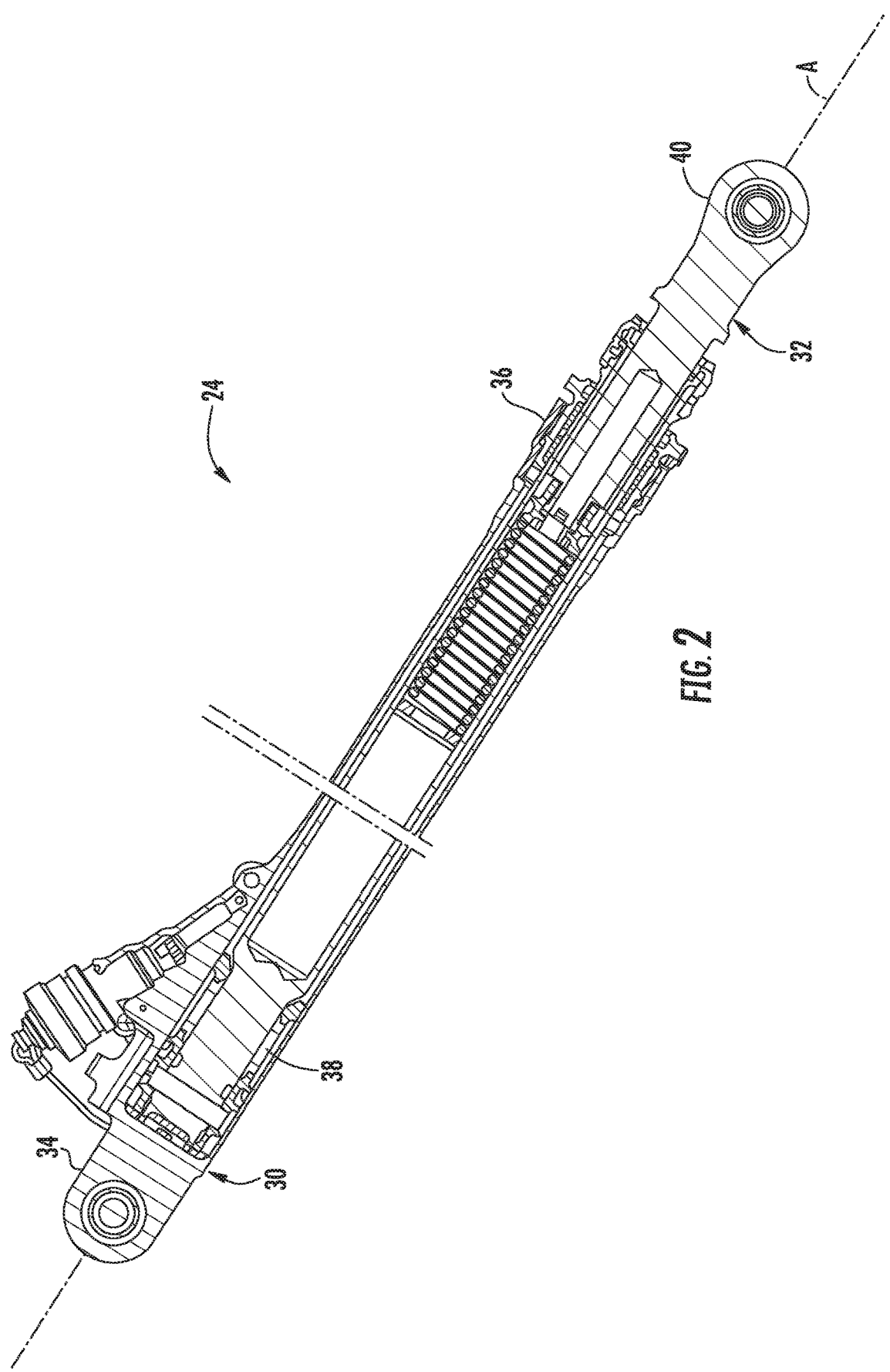
FIG. 2 is a cross section of the hydraulic piston actuator.

Referring to FIGS. 1 and 2, the hydraulic piston actuator 24 may include a housing 30 and an elongated piston 32 adapted to reciprocate within the housing 30 along an axis A. The housing 30 may include opposite end portions 34, 36, and the piston 32 may include opposite end portion 38, 40. The end portion 34 of the housing 30 may be pivotally engaged to the substructure 26, and the piston 32 may project out of the end portion 36. The end portion 38 of the piston 32 may generally reside within the housing 30, and the opposite end portion 40 may be pivotally engaged to the cowl door 22. Alternatively, it is contemplated that the housing 30 may be pivotally engaged to the cowl door 22 and the piston 32 may be pivotally engaged to the substructure 26.

Referring to FIG. 3, the hydraulic piston actuator 24 may further include an end gland 42, a bearing ring 44, and a scraper seal 46. The end gland 42 is substantially disposed radially between the end portion 36 of the housing 30 and the bearing ring 44. The bearing ring 44 is disposed radially between the end gland 42 and the piston 32. The scraper seal 46 is disposed radially between the end gland 42 and the piston 32, but may be axially offset from, or disposed outside of, the housing 30. The end gland 42 is adapted to withstand radially loads (see arrows 48) exerted upon the end portion 36 of the housing 30 during operation and/or vibration of the piston actuator 24. In one embodiment the end gland 42 and the piston 32 may be metallic, and the piston 32 may be made of a material that is harder than the end gland. For example, the piston 32 may, at least in-part, be made of stainless steel and the end gland 42 may be made of a bronze alloy.

The end gland 42 is generally annular and may include a circumferentially continuous base segment 50 and an annular protruding segment 52 that projects radially outward from the base segment 50. When the piston actuator 24 is assembled, the protruding segment 52 may be disposed outside of the housing 30 and may axially abut (i.e., is indexed to) a distal and circumferentially continuous edge 54 of the end portion 36 of the housing 30. The base segment 50 of the end gland 42 is substantially disposed inside of the end portion 36 of the housing 30 (i.e., disposed radially inward from the end portion 36), and is generally attached to the end portion 36.

Figure 5:
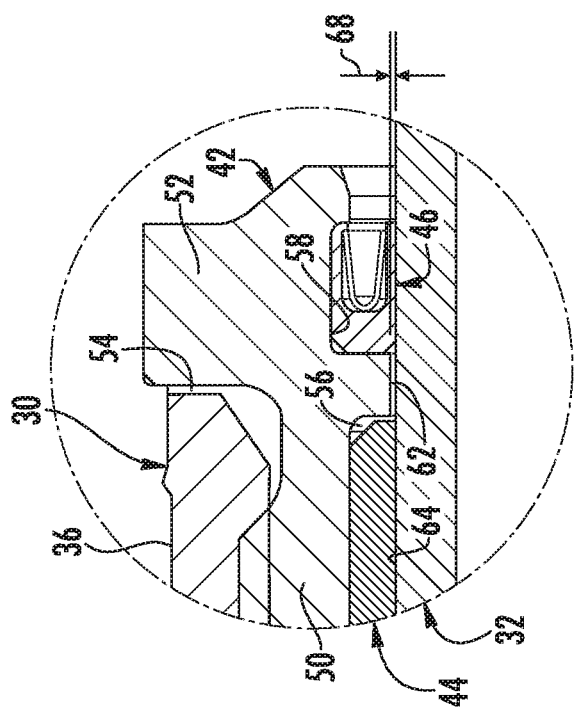
FIG. 5 is a cross section of the hydraulic piston actuator taken from circle 5 of FIG. 3.
Figure 4:
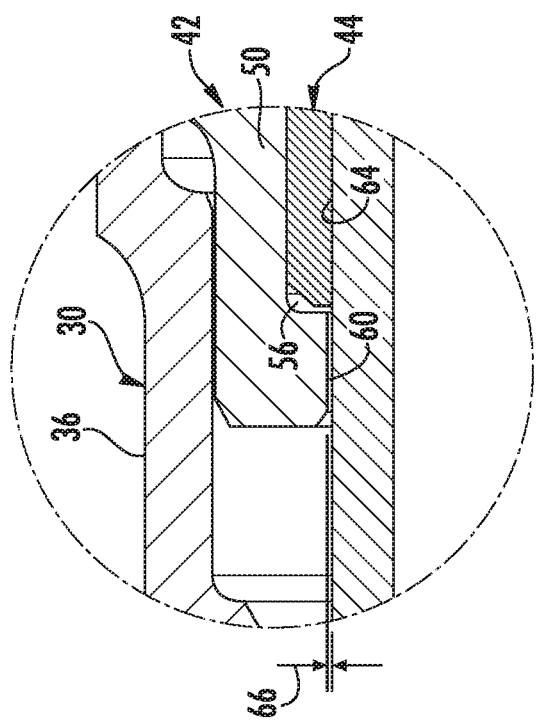
FIG. 4 is a cross section of the hydraulic piston actuator taken from circle 4 of FIG. 3.

Referring to FIGS. 3 through 5, the base segment 50 of the end gland 42 may define an annular channel 56 that communicates radially inward (i.e., is open in a radially inward direction), and an annular groove, or bore, 58 that may also communicate radially inward. The base segment 50 may carry two circumferentially continuous surfaces 60, 62 that may be cylindrical, face radially inward, and oppose a circumferentially continuous face 64 that may be cylindrical and carried by the piston 32. First and second annular clearances (see respective arrows 66, 68 in FIGS. 4 and 5) are defined between the face 64 and the respective surface 60, 62. In one embodiment, the radial and circumferential distances of the first clearance 66 may be about the same as the distances of the second clearance 68. The first and second surfaces 60, 62 may be axially separated by the annular channel 56, and the annular channel 56 may be axially separated from the annular groove 58 by the second surface 62.

The scraper seal 46 is substantially disposed in the groove 58, is generally engaged to the base segment 50 of the end gland 42, and may be axially aligned to the protruding segment 52. The scraper seal 46 projects radially inward from the end gland 42 for sliding contact with the face 64 of the piston 32. In operation, the scraper seal 46 facilitates the removal of debris and water from the piston 32 to prevent ingress into the housing 30.

When the piston actuator 24 is fully assembled and in operation, the end gland 42 does not make contact with the reciprocating piston 32, but does provide structural support for and at the end portion 36 of the housing 30. The bearing ring 44 that projects radially inward from the end gland 42, however, does make sliding contact with the reciprocating piston 32. To minimize friction between the piston 32 and bearing seal 44, the bearing seal may be made of a thermoplastic that may be reinforced with carbon fibers that may contain graphite. Another advantage of the bearing seal material is the reduction or elimination of facial scoring of the piston 32 and/or the reduction or elimination of material deposits being placed upon the face 64 of the piston 32 from the bearing seal 44. By reducing any piston scoring or foreign deposits upon the piston face, the scraper seal 46 functionality and life may be optimized.

Advantages and benefits may include a piston actuator that does not require a lubricant (e.g., liquid lubricant) between various seals supported by the housing 30 and sealing against the reciprocating piston 32 to prevent degradation of the piston surface caused by, for example, vibrations that produce radial loading.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydraulic piston actuator comprising:

a housing concentrically disposed along an axis;

a piston adapted to axially reciprocate within the housing;

an end gland disposed radially between the housing and the piston;

a bearing ring disposed radially between the end gland and the piston; and a scraper seal axially aligned to, and disposed radially between, the end gland and the piston, wherein the piston includes a cylindrical face facing radially outward, and the end gland includes a first cylindrical surface opposing the cylindrical face and disposed directly between the scraper seal and the bearing ring, wherein the bearing ring is made of a material that includes thermoplastic, and the piston is metallic, and wherein the thermoplastic is re-inforced with carbon fiber/graphite.

2. The hydraulic piston actuator set forth in claim 1, wherein the piston is made of stainless steel.

* * * * *